Patented Aug. 28, 1951

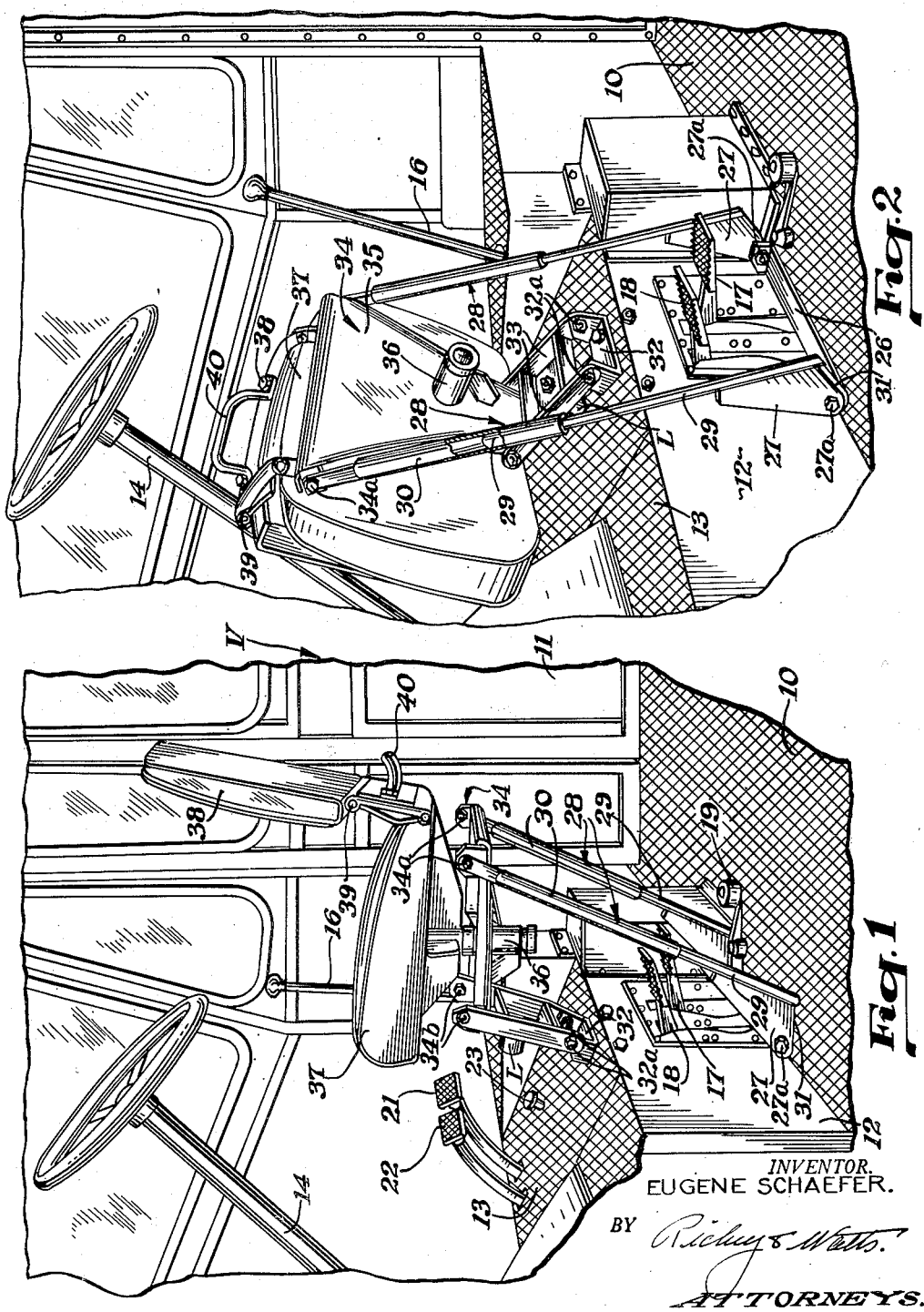

2,565,666

UNITED STATES PATENT OFFICE 2,565,666

SHIFTABLE VEHICLE SEAT

Eugene Schaefer, Cleveland, Ohio, assignor to The White Motor Company, Cleveland, Ohio, a corporation of Ohio Application December 16, 1948, Serial No. 65,670

5 Claims. (Cl. 180—77)

This invention relates broadly to seats for motor vehicles and, more particularly, to folding seats for delivery trucks of the type that may be operated by the driver while standing or in a seated position. In further detail, the invention contemplates a seat that may be moved forwardly to provide a clear free area for the operator to manipulate the various controls while standing, or moved rearwardly to facilitate the operation of the vehicle with the driver in a seated position.

One of the objects of the invention is to provide a seat that presents virtually no obstruction to the driver as he manipulates the controls from a standing position.

Another object is to provide a seat that may be readily adjusted from its operative position (while the driver is seated) to its folded position (while the driver stands) by merely tipping the seat forwardly and simultaneously folding the back rest downwardly.

Briefly, these objects are accomplished by mounting the seat on a pair of distensible legs pivoted adjacent their lower ends to the low level platform of the chassis and to a seat subframe at their upper ends. The forward portion of the sub-frame is pivoted to links having the lower end thereof fulcrumed upon an elevated platform constituting the floor board footrest of the vehicle. The distensible legs straddle the stand-up pedal controls and the back rest, when folded, clears the second pedal control set. With this construction, when the seat is tilted forward the rear legs thereof will be brought into intimate engagement with the forward edge of the floor board riser as the sub-frame linkage comes to rest upon the face thereof and the seat will be nested in the recess between the steering wheel and the elevated portion of the floor.

Another object of the invention resides in the provision of a structure which will assure the stability of the assembly while the driver is seated without the necessity of any locking mechanism for the movable parts thereof. This is accomplished by constructiing the distensible legs with stops to delimit the downward movement thereof, the construction being such that the center of gravity of the assembly and the weight of the operator urges the seat against the stops when the seat is adjusted to its operative position.

The manner in which these and other objects of the invention are attained will be apparent from the following detailed description of a preferred embodiment of the invention.

In the drawings:

Fig. 1 is a perspective view of the seat in its operative position in the vehicle; and Fig. 2 shows the seat in its forward inoperative position to permit the operation of the vehicle by the driver while standing.

The vehicle V is of the low entry type, such as used in door-to-door delivery of milk, bakery goods, and similar merchandise. Accordingly, the vehicle is formed with a low level platform 10 upon which the driver may stand while operating the truck. Access to the driving platform is gained by doors 11 in the opposed sides of the vehicle and the forward portion of the body is formed with a riser 12 which terminates in inclined floor boards 13 constituting a footrest for the driver when operating the vehicle while seated.

The controls, which are common to both driving positions, include the steering wheel assembly 14 and the transmission gear shift lever 16. The controls for operating the truck while the driver is standing embody a parking brake pedal 17 and clutch pedal 18, the latter being preferably organized to effect the application of the service brake (not shown) upon disengagement of the clutch. The pedals 17 and 18 protrude from the riser 12 and are disposed generally in parallel relation to the platform 10. A foot throttle lever 19 is mounted on the platform 10 for lateral oscillatory movement by the foot of the operator. The controls for the driver while seated comprise the conventional clutch and brake pedals 21 and 22 and a foot throttle button 23.

The seat-supporting structure embodies a bracket 26 secured to the platform 10 and formed with vertically disposed ears having plates 27 fulcrumed thereon as at 27a. The plates support a pair of legs 28 which are welded to the forward edge thereof and the inner edges of the plates are sheared to clear the riser 12 when the seat assembly is adjusted to its inoperative position. In the preferred embodiment, the legs comprise a pair of rods 29 welded or otherwise secured to the plates 27 and a pair of tubular members 30 telescopically engaged therewith and pivotally mounted on the seat sub-frame adjacent the closed ends thereof. A bracket 32 fabricated for the pivotal support at 32a of a pair of link members 33 is mounted on the floor board 13. The links are united by cross bars and a cover plate having a lug L mounted thereon to arrest the forward movement of the assembly when the seat is adjusted to the position shown in Fig.

2. A seat sub-frame 34 is pivotally connected as at 34a to the upper ends of the tubular legs 30 and at 34b to the upper ends of the links 33. The frame 34 comprises a pair of side rails and a bottom plate 35 having a socket 36 secured thereto for the reception of a pintle mounted on the base of an upholstered seat 37. The free end of the pintle is provided with a collar which may be adjusted relative to the end of the socket to facilitate either the swivel action of the seat or the rigid securement thereof. The back rest 38 of the seat is pivoted on brackets 39 secured to the seat and a handle 40 is provided on the bracket 39 to accommodate manipulation thereof.

In operation, when it is desired to adjust the seat from its inoperative position (Fig. 2) to its operative position (Fig. 1) the handle 40 may be pulled rearwardly until the lower faces 31 of the plates 27 abut the platform 10 and the upper ends of the rods 29 engage the closed ends of the tubes 30. The seat parts, stops, and pivotal mounting of the telescoping legs are so arranged that when the seat is in its operative position with the stops engaging the floor of the vehicle, the center of gravity of the seat is rearward of the aforesaid pivotal mounting, so that the action of gravity tends to keep the seat in its rearward, or operative position. When it is desired to adjust the seat to its inoperative position in order to accommodate a standing position of the driver, the back 38 may be folded against the seat 37; then, by gripping the handle 40, the seat assembly may be pushed forwardly into the recess below the steering wheel until the lug L engages the floor board 12. During this operation the link member 33 will rock toward the floor boards 13 and draw the leading edge of the seat 37 forward and downwardly. As the rearward portion of the seat is rocked forwardly the pivoted telescopic legs 29 and 30 will accommodate the arcuate movement and elevation thereof. The seat and linkage therefor are proportioned so that the folded seat assembly will clear the pedals 21 and 22 and steering wheel column 14, thus, when the seat is folded, all the controls, including the pedals 17 and 18 and the gear shift lever 16, are readily accessible, and a clear free passageway or cross aisle is afforded in the driver's compartment of the truck.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A delivery vehicle including a chassis having a low level platform for stand-up operation and a raised footrest platform for sit-down operation forwardly thereof, extensible leg means pivotally mounted on said vehicle adjacent a forward portion of said low level platform, link means pivotally mounted on said footrest platform, and a seat pivotally mounted on the upper ends of said leg means and said link means, stop means on said leg means and arranged to engage a fixed part of said vehicle restricting rearward pivotal motion of said leg means to a position where said seat is substantially horizontal, forward pivotal motion of said link means causing the front of said seat to tilt downwardly, said extensible leg means providing for a forward and upward motion of the rear portion of said seat.

2. A delivery vehicle including a chassis having a low level platform for stand-up operation and a raised footrest platform for sit-down operation forwardly thereof, extensible leg means pivotally mounted on said vehicle adjacent said low level platform, link means pivotally mounted on said footrest platform, and a seat pivotally mounted on the upper ends of said leg means and said link means, stop means on said leg means and arranged to engage a fixed part of said vehicle restricting rearward pivotal motion of said leg means to a position where said seat is substantially horizontal, forward pivotal motion of said link means causing the front of said seat to tilt downwardly, said extensible leg means providing for a forward and upward motion of the rear portion of said seat, said stop means being arranged so that when in engagement with said fixed vehicle part said seat is at its rearward position and is generally horizontal.

3. A delivery vehicle including a chassis having a low level platform and a raised footrest platform forwardly thereof, stand-up drive pedal controls arranged for operation from a standing position on said low level platform, sit-down drive pedal controls adjacent said footrest platform, a pair of telescoping legs pivotally mounted on said vehicle and adjacent a forward portion of said low level platform, said legs straddling said stand-up drive controls, link means pivotally mounted on said footrest platform, and a seat pivotally mounted on the upper ends of said legs and link means, stop means on said legs and arranged to engage said low level platform for restricting rearward pivotal motion of said legs to a position where said seat is substantially horizontal, forward motion of said link means causing the front of said seat to tilt downwardly, said telescoping legs providing for a forward and upward motion of the rear portion of said seat.

4. A delivery vehicle including a chassis having a low level platform and a raised footrest platform forwardly thereof, stand-up drive pedal controls arranged for operation from a standing position on said low level platform, sit-down drive pedal controls adjacent said footrest platform, a pair of telescoping legs pivotally mounted on said low level platform and straddling said stand-up drive controls, link means pivotally mounted on said footrest platform, and a seat pivotally mounted on the upper ends of said legs and link means, stop means on said legs and arranged to engage a fixed part of said vehicle for restricting rearward pivotal motion of said legs to a position where said seat is substantially horizontal, forward motion of said link means causing the front of said seat to tilt downwardly, said telescoping legs providing for a forward and upward motion of the rear portion of said seat, said stop means being arranged so that when acting to limit rearward motion of said seat the center of gravity of the seat assembly is rearwardly of the pivotal mounting of said telescoping legs.

5. A delivery vehicle including a chassis having a low level platform and a raised footrest platform forwardly thereof, stand-up drive pedal controls arranged for operation from a standing position on said low level platform, sit-down drive pedal controls adjacent said footrest platform, a pair of telescoping legs pivotally mounted on a forward portion of said low level platform and straddling said stand-up drive controls, link means pivotally mounted on said footrest platform, and a seat pivotally mounted on the upper ends of said legs and link means, stop means on said legs and arranged to engage said low level platform for restricting rearward pivotal motion of said legs to a position where said seat is substantially horizontal, forward motion of said link means causing the front of said seat to tilt downwardly against said footrest platform and rearwardly of said sit-down pedal controls, said telescoping legs providing for a forward and upward motion of the rear portion of said seat.

EUGENE SCHAEFER.

REFERENCES CITED

The following references are of record in the file of this patent:

UNITED STATES PATENTS

| Number | Name | Date |
| --- | --- | --- |
| 385,329 | Stratton | June 26, 1888 |
| 1,099,253 | Kennedy et al. | June 9, 1914 |
| 1,491,144 | Kondroik | Apr. 22, 1924 |
| 2,003,431 | Fageol | June 4, 1935 |
| 2,318,751 | Carlson | May 11, 1943 |